United States Patent
Li et al.

(10) Patent No.: US 12,525,039 B2
(45) Date of Patent: Jan. 13, 2026

(54) CHERRY PICKING AND CLASSIFYING METHOD AND DEVICE BASED ON MACHINE VISION

(71) Applicant: Hangzhou Dianzi University, Hangzhou (CN)

(72) Inventors: Xiaodong Li, Hangzhou (CN); Zhengsheng Yu, Hangzhou (CN); Zhaozhe Gong, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 504 days.

(21) Appl. No.: 18/156,908

(22) Filed: Jan. 19, 2023

(65) Prior Publication Data

US 2023/0360411 A1 Nov. 9, 2023

(30) Foreign Application Priority Data

May 7, 2022 (CN) .......................... 202210493160.9

(51) Int. Cl.
*G06T 7/12* (2017.01)
*A01D 46/30* (2006.01)
(Continued)

(52) U.S. Cl.
CPC .............. *G06V 20/68* (2022.01); *A01D 46/30* (2013.01); *G06T 7/12* (2017.01); *G06T 7/60* (2013.01);
(Continued)

(58) Field of Classification Search
CPC ........ G06V 20/68; G06V 10/26; G06V 10/30; G06V 10/44; G06V 10/56; G06V 10/764;
(Continued)

(56) References Cited

U.S. PATENT DOCUMENTS

2021/0287001 A1* 9/2021 Meltzer ................. G06N 20/10
2021/0393728 A1* 12/2021 Vella .................... A61K 31/198
(Continued)

FOREIGN PATENT DOCUMENTS

CN  112861654  5/2021
CN  113843810  12/2021
(Continued)

OTHER PUBLICATIONS

Notification to Grant Patent Right for Invention for Chinese Patent Application No. 202210493160 .9, issued Apr. 1, 2025, 2 pages.
Notice of First Office Action for Chinese Patent Application No. 202210493160 .9, issued Dec. 26, 2024, 12 pages.

*Primary Examiner* — Ali Bayat
(74) *Attorney, Agent, or Firm* — DLA Piper LLP (US)

(57) ABSTRACT

The present disclosure provides a cherry picking and classifying method based on machine vision, including: acquiring an image for a cherry with a stem hung on a branch, filtering the image to remove noise, and taking a resulting image as an original image; processing the original image to extract a stem feature of the cherry, and determining a picking point for picking; acquiring an image for a picked cherry to obtain a classification image; processing the classification image to extract a contour feature of the cherry, and calculating a size of the cherry according to the contour feature; and classifying the cherry according to size data of the cherry. The present disclosure further provides a picking and classifying device, including: an acquisition module, a classifying transmission module, a connection module; and a control module.

13 Claims, 4 Drawing Sheets

(51) Int. Cl.
*G06T 7/60* (2017.01)
*G06T 7/90* (2017.01)
*G06V 10/26* (2022.01)
*G06V 10/30* (2022.01)
*G06V 10/44* (2022.01)
*G06V 20/68* (2022.01)

(52) U.S. Cl.
CPC ............. *G06T 7/90* (2017.01); *G06V 10/26* (2022.01); *G06V 10/30* (2022.01); *G06V 10/44* (2022.01); *G06T 2207/10024* (2013.01); *G06T 2207/20021* (2013.01); *G06T 2207/30188* (2013.01)

(58) Field of Classification Search
CPC .......... G06V 10/22; A01D 46/30; G06T 7/12; G06T 7/60; G06T 7/90; G06T 2207/10024; G06T 2207/20021; G06T 2207/30188; G06T 7/62; G06T 7/11; G06T 7/246
USPC ........................................................ 382/110
See application file for complete search history.

(56) References Cited

U.S. PATENT DOCUMENTS

| | | | |
|---|---|---|---|
| 2022/0015360 A1* | 1/2022 | Reddy | A01N 37/42 |
| 2022/0392209 A1* | 12/2022 | Bossard | G06V 10/987 |
| 2023/0214982 A1* | 7/2023 | Michel | G06V 10/255 |
| | | | 382/110 |

FOREIGN PATENT DOCUMENTS

| | | |
|---|---|---|
| CN | 114227676 | 3/2022 |
| CN | 115147638 | 5/2025 |

* cited by examiner

CHERRY PICKING AND CLASSIFYING METHOD AND DEVICE BASED ON MACHINE VISION

CROSS-REFERENCE TO RELATED APPLICATION

This application claims priority to Chinese Patent Application Number 202210493160.9, filed May 7, 2022, which is incorporated herein by reference in its entirety.

TECHNICAL FIELD

The present disclosure relates to the technical field of cherry picking, and in particular to a cherry picking and classifying method and device based on machine vision.

BACKGROUND

In automatic picking, it is crucial to identify and position ripe apple objects with a visual system. Relevant algorithms for automatically detecting, identifying and positioning fruits based on image processing have become hotspots in automatic picking of the fruits.

The Chinese Patent Application No. CN 113843810 A filed on Dec. 28, 2021 provides a "Spherical-like Fruit Picking Robot based on Machine Vision and a Fruit Picking Method Thereof". The spherical-like fruit picking robot based on machine vision includes a picking device, a collecting device, a traveling device, a control console, and a telescopic hose. The picking device includes a mechanical arm base, a base rotating motor, a mechanical arm device, an end effector, an internal visual sensor, a large fruit shearing device, a small and medium-sized fruit clamp, and an external visual sensor. The end effector is connected to the collecting device through the telescopic hose. A picking robot controls the picking device, the traveling device and the collecting device through the control console for fruit picking. The technology can efficiently pick sparsely growing spherical-like fruits such as apples, pears, oranges, lemons, grapefruits, durians, kiwifruits, and grapes. It can greatly improve cost performance of the picking robot, reduce a fruit picking cost, and yield a better quality of picked fruits. However, the technology is only applicable to picking the sparsely growing spherical-like fruits, including large spherical-like fruits, medium spherical-like fruits with stems, medium spherical-like fruits without stems and small spherical-like fruits with branches. For cherries that are small spherical-like fruits with long stems, and grow in dense but not stringed clusters, as shown in FIG. 7, automatic picking in the prior art is not available. Therefore, it is desired to provide an automatic picking technology for the cherries.

SUMMARY

The present disclosure provides a cherry picking and classifying method and device based on machine vision, to overcome problems of no automatic picking technology for a cherry and low picking efficiencies of other fruit-vegetable picking technologies for the cherry in the prior art. Since the cherry is a small spherical-like fruit with a long stem, the present disclosure provides a specific picking and classifying method for the cherry based on the machine vision, and can improve a cherry picking efficiency.

To achieve the above objective, the present disclosure adopts the following technical solutions:

A cherry picking and classifying method based on machine vision includes:
S1: acquiring an image for a cherry with a stem hung on a branch, filtering the image to remove noise, and taking a resulting image as an original image;
S2: processing the original image to extract a stem feature of the cherry, and determining a picking point for picking;
S3: acquiring an image for a picked cherry to obtain a classification image;
S4: processing the classification image to extract a contour feature of the cherry, and calculating a size of the cherry according to the contour feature; and
S5: classifying the cherry according to size data of the cherry.

According to the present disclosure, an image for a cherry hung on a branch is photographed. The image includes a fruit and a stem of the cherry. When the cherry is picked, the fruit and a part of the stem are picked. Since the fruit is damaged easily when picked independently, the stem of the cherry is sheared in automatic picking. An original image is processed to extract an image for the stem and a neighboring region thereof. A stem feature is extracted from the image. A picking point is determined according to the stem feature to pick the cherry. An image for a picked cherry is acquired to obtain a classification image. The classification image is processed to extract a contour of the cherry. A number of pixels in the contour of the cherry serves as a basis for determining a size of the cherry. The present disclosure makes the cherry picked more conveniently and efficiently. Meanwhile, by determining the size of the cherry according to the number of pixels in the image for the cherry, the present disclosure can classify the cherry automatically, and save a manual classification cost.

Preferably, S2 includes the following steps:
S21: performing grayscale extraction on the original image with a color factor to obtain an original grayscale image;
S22: transforming the original image into a hue-intensity-saturation (HIS) model image, and performing H-based segmentation to obtain a mask image;
S23: excluding a fruit region in combination with the original grayscale image and the mask image to obtain a grayscale image for the stem and a neighboring region thereof,
S24: binarizing the grayscale image in S23 with an Otsu algorithm to obtain a connecting point between the stem and the fruit, and a growing point between the stem and the branch; and
S25: performing weighted calculation on the connecting point and the growing point to obtain the picking point.

According to the present disclosure, the original grayscale image and the mask image are the same in size. The mask image includes a cherry fruit region and a remaining region. Since the cherry greatly differs from surrounding green leaves in color, the H-based segmentation performed through an HIS model can obtain a more desirable and accurate cherry fruit region. The fruit region is excluded from the original grayscale image through the mask image to obtain the grayscale image only including the stem and the neighboring region thereof, which prevents the color of the fruit from affecting a binarization result in subsequent binarization. From a binary image for the stem and the neighboring region thereof, the connecting point and the growing point can be searched. A connecting line between the two points is approximate to a length of the stem. Hence, the weighted calculation can be performed according to an actual need to obtain the picking point on the stem.

Preferably, the color factor is one of red (R), green (G), and blue (B) components in three primary colors or one of composite components of the three primary colors; a plurality of historically acquired cherry images are sampled; a component value of a color in a cherry region and a component value of a color in a background region are calculated with a same color factor to form a scatter plot; and a color factor making an intersection between the component values of the colors of the two regions in the scatter plot least is selected to perform the grayscale extraction on the original image.

According to the present disclosure, the color factor includes components in the three primary colors and different combination thereof such as the R component, the G component, the B component, a |G−B| component, a |G−R| component and a |G−B|+|G−R| component. When some color factor for calculating the component value of the color in the cherry region and the component value of the color in the background region makes the intersection between the component values in the scatter plot least, there is a maximum grayscale difference between the cherry region and the background region in the grayscale image obtained by performing the grayscale extraction with the color factor, for better ease of subsequent image processing.

Preferably, a stem-branch contour is obtained from a binary image in S24 with a contour tracing algorithm; after the binary image coincides with the mask image, the stem-branch contour is intersected with a boundary of the fruit region on the mask image at a point $A_1$ and a point $B_1$; and a midpoint on a connecting line between the point $A_1$ and the point $B_1$ serves as the connecting point; and in gradual movement from the point $A_1$ along the stem-branch contour and away from the fruit region, there comes a point $A_i$ that makes $\alpha = S_{CAi}/S_{Ai}$ greater than a preset threshold; in gradual movement from the point $B_1$ along the stem-branch contour and away from the fruit region, there comes a point $B_j$ that makes $\alpha = S_{CBj}/S_{Bj}$ greater than the preset threshold; and a midpoint on a connecting line between the point $A_i$ and the point $B_j$ serves as the growing point, where $S_{Ai}$ and $S_{Bj}$ are respectively a number of pixels in a circle $A_i$ and a circle $B_j$; the circle $A_i$ and the circle $B_j$ respectively take the point $A_i$ and the point $B_j$ as a center and a length of a segment $|A_1B_1|$ as a radius; and $S_{CAi}$ and $S_{CBj}$ are respectively a number of pixels between the two circles and the stem-branch contour.

According to the present disclosure, the stem-branch contour after the binarization is white or black, while the remaining background is black or white reversely. With the white stem-branch contour for description, the stem includes one end connected to the branch at the growing point, and the other end connected to the fruit at the connecting point. Since the stem has a certain width, there comes a curve at a junction between the stem contour and the boundary of the fruit region. The point $A_1$ and the point $B_1$ are selected as two endpoints of the curve, and the midpoint on the connecting line between the two points serves as the connecting point. For a circle with any point on the contour where the stem region is located as a center and the segment $|A_1B_1|$ as a radius, a proportion of a white region to the whole circle is $\alpha$. When the center is located on the contour of the stem region, the ratio $\alpha$ is less than a preset threshold. When the ratio $\alpha$ is greater than the preset threshold, the white portion of the circle includes not only the stem region, but also the branch region or other stem regions. According to this principle, the growing point can be determined.

Preferably, S4 includes the following steps:
S41: filtering the classification image to remove noise, and transforming a resulting image into a classification grayscale image;
S42: processing the classification grayscale image with an edge detection operator to extract a contour of the cherry; and
S43: calculating a number of pixels in the contour of the cherry.

The present disclosure acquires the image for the picked cherry, while ensuring that each image has a same pixel, a same size, and a same actual area. As a consequence, while variables are consistent, the area of the cherry is replaced with the number of pixels in the contour of the cherry in the image to take as a measured size of the cherry. Meanwhile, the present disclosure processes the classification grayscale image with the edge detection operator to obtain a more accurate contour of the cherry.

A cherry picking and classifying device based on machine vision includes:
an acquisition module configured to acquire an image for a cherry with a stem hung on a branch, and pick the cherry;
a classifying transmission module configured to acquire an image for a picked cherry and calculate a size of the cherry for classifying;
a connection module configured to connect the acquisition module and the classifying transmission module, and drive the acquisition module to move; and
a control module configured to control work of the cherry picking and classifying device.

According to the present disclosure, the acquisition module acquires and photographs an image for a cherry on a branch, processes and analyzes the image for the cherry, determines a picking point on a stem corresponding to the cherry, and picks the cherry. The connection module drives the acquisition module to move, and puts a cherry picked by the acquisition module into the classifying transmission module. The classifying transmission module arranges cherries sequentially for transmission, acquires images of the cherries to obtain sizes of the cherries, and transmits the cherries to different positions according to the sizes of the cherries for storage.

Preferably, the acquisition module includes at least three connecting arms; a range positioning device is provided on each of the three connecting arms; a tail end of a first connecting arm is provided with a picking device; a tail end of a second connecting arm is provided with an image acquisition device; and a tail end of the third connecting arm is provided with a placement device.

According to the present disclosure, the connecting arms can be telescopic and bendable, such that the picking device or the image acquisition device can pick the cherry or photograph the image from different positions and angles. Devices having different functions are provided at tail ends of the connecting arms, so it is freer to acquire the image and pick the cherry. When affected by leaves, the connecting arms can be adjusted in angle and position for working. Since the range positioning device is provided on each of the connecting arms, the cherry can be positioned through distances from three different points to the cherry, for ease of subsequent picking. The placement device may be an elastic net bag or other devices, and is configured to temporarily place the picked cherry and prevent a dropping cherry from being damaged.

Preferably, the classifying transmission module includes an input unit; the input unit transmits the picked cherry to each of a plurality of branch classification units through a sorting unit; and an image acquisition unit is provided fittingly above the branch classification unit.

According to the present disclosure, cherries in the placement device are continuously transmitted by the input unit after transferred to the input unit. The cherries can be flowed to different branch classification units through the sorting unit, the branch classification units each transmit one cherry at a time, and two adjacent cherries are spaced by a certain distance. The image acquisition unit is provided fittingly above the branch classification unit, and a width of a visual field of the image acquisition unit is the same as a width of the branch classification unit, which ensures that each acquired image has same size and pixel.

The present disclosure has the following beneficial effects: Since the cherry is the small spherical-like fruit with the long stem, the present disclosure provides the specific picking and classifying method for the cherry based on the machine vision, which reduces a large number of manpower demands required by manual picking, automatically picks and identifies the cherry, and improves the cherry picking efficiency. Upon completion of picking, the present further provides the cherry classifying process based on the machine vision, which can classify the cherry according to the size of the cherry, omit the subsequent manual classification, save manpower and material resources, and improve the efficiency.

DETAILED DESCRIPTION OF THE EMBODIMENTS

The present disclosure is further described below in combination with the accompanying drawings and specific implementations.

Figure 1:
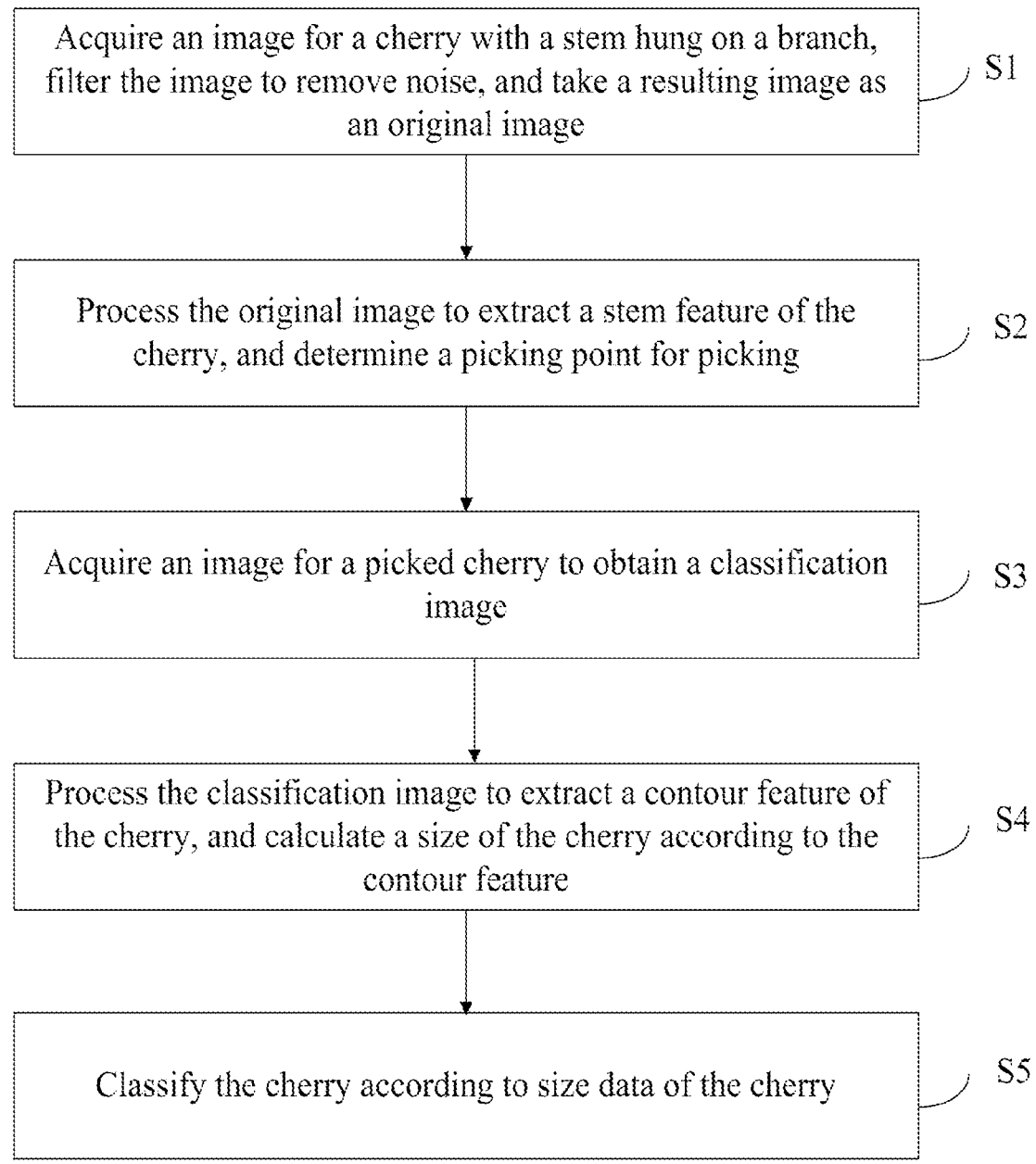
FIG. 1 is a flowchart of a cherry picking and classifying method according to the present disclosure.

As shown in FIG. 1, a cherry picking and classifying method based on machine vision includes:

S1: Acquire an image for a cherry with a stem hung on a branch, filter the image to remove noise, and take a resulting image as an original image.

S2: Process the original image to extract a stem feature of the cherry, and determine a picking point for picking. S2 includes the following steps:

S21: Perform grayscale extraction on the original image with a color factor to obtain an original grayscale image.

S22: Transform the original image into an HIS model image, and perform H-based segmentation to obtain a mask image.

S23: Exclude a fruit region in combination with the original grayscale image and the mask image to obtain a grayscale image for the stem and a neighboring region thereof.

S24: Binarize the grayscale image in S23 with an Otsu algorithm to obtain a connecting point between the stem and the fruit, and a growing point between the stem and the branch.

S25: Perform weighted calculation on the connecting point and the growing point to obtain the picking point.

S3: Acquire an image for a picked cherry to obtain a classification image.

S4: Process the classification image to extract a contour feature of the cherry, and calculate a size of the cherry according to the contour feature. S4 includes the following steps:

S41: Filter the classification image to remove noise, and transform a resulting image into a classification grayscale image.

S42: Process the classification grayscale image with an edge detection operator to extract a contour of the cherry.

S43: Calculate a number of pixels in the contour of the cherry.

S5: Classify the cherry according to size data of the cherry.

The color factor is one of R, G, and B components in three primary colors or one of composite components of the three primary colors. A plurality of historically acquired cherry images are sampled. A component value of a color in a cherry region and a component value of a color in a background region are calculated with a same color factor to form a scatter plot. A color factor making an intersection between the component values of the colors of the two regions in the scatter plot least is selected to perform the grayscale extraction on the original image.

Figure 6:
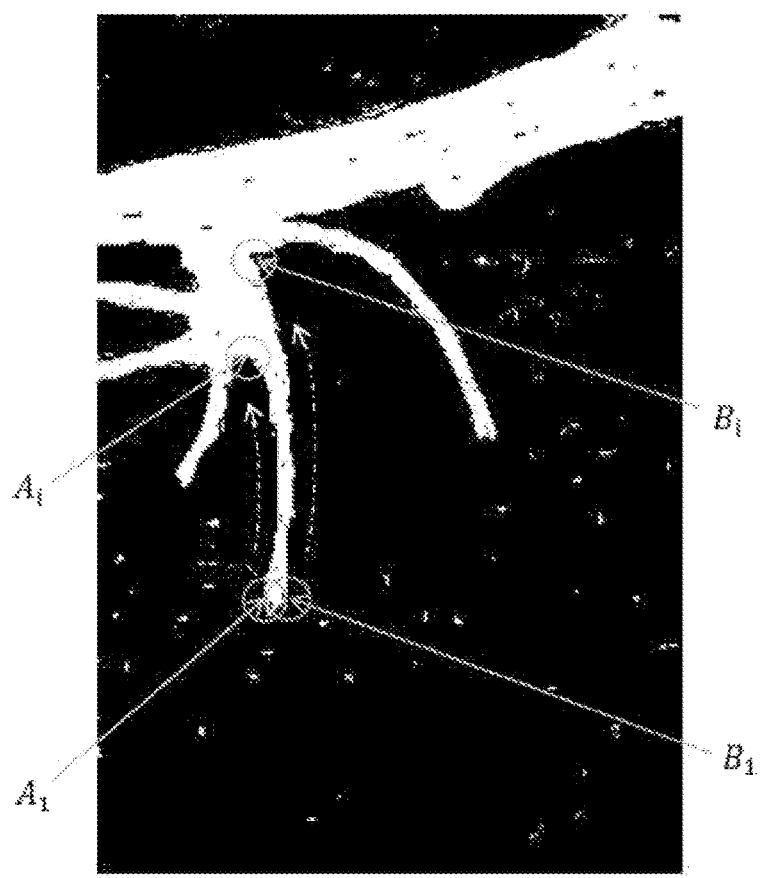
FIG. 6 is a schematic view illustrating a connecting point and a growing point according to an embodiment of the present disclosure.
Figure 7:
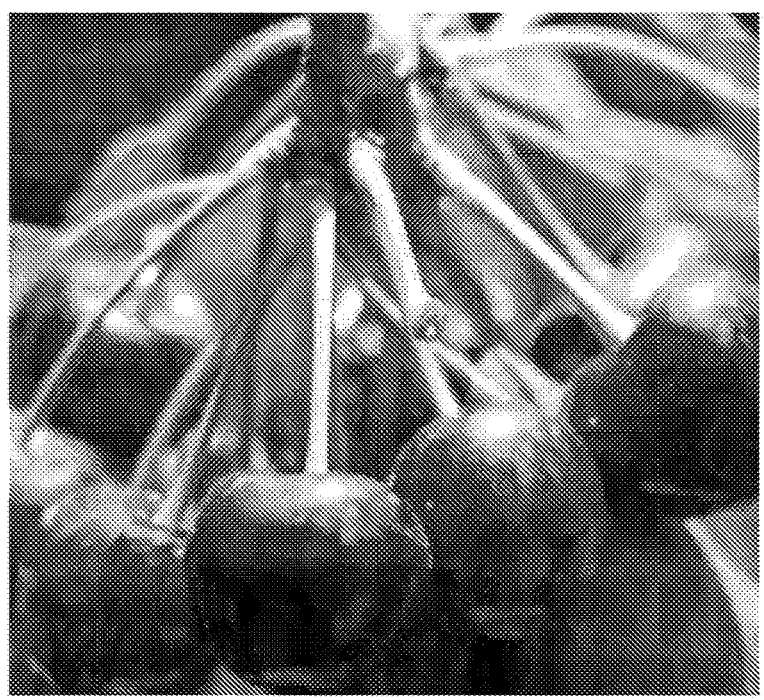
FIG. 7 is a schematic view of a cherry hung on a branch according to the background.

As shown in FIG. 6, a stem-branch contour is obtained from a binary image in S24 with a contour tracing algorithm. After the binary image coincides with the mask image, the stem-branch contour is intersected with a boundary of the fruit region on the mask image at a point $A_1$ and a point $B_1$. A midpoint on a connecting line between the point $A_1$ and the point $B_1$ serves as the connecting point.

In gradual movement from the point $A_1$ along the stem-branch contour and away from the fruit region, there comes a point $A_i$ that makes $\alpha = S_{CAi}/S_{Ai}$ greater than a preset threshold. In gradual movement from the point $B_1$ along the stem-branch contour and away from the fruit region, there comes a point $B_j$ that makes $\alpha = S_{CBj}/S_{Bj}$ greater than the preset threshold. A midpoint on a connecting line between the point $A_i$ and the point $B_j$ serves as the growing point.

$S_{Ai}$ and $S_{Bj}$ are respectively a number of pixels in a circle $A_i$ and a circle $B_j$. The circle $A_i$ and the circle $B_j$ respectively take the point $A_i$ and the point $B_j$ as a center and a length of a segment $|A_1B_1|$ as a radius. $S_{CAi}$ and $S_{CBj}$ are respectively a number of pixels between the two circles and the stem-branch contour.

According to the present disclosure, an image for a cherry hung on a branch is photographed. The image includes a fruit and a stem of the cherry. When the cherry is picked, the fruit and a part of the stem are picked. Since the fruit is damaged easily when picked independently, the stem of the cherry is sheared in automatic picking. An original image is processed to extract an image for the stem and a neighboring region thereof. A stem feature is extracted from the image. A picking point is determined according to the stem feature to pick the cherry. An image for a picked cherry is acquired to obtain a classification image. The classification image is processed to extract a contour of the cherry. A number of pixels in the contour of the cherry serves as a basis for determining a size of the cherry. The present disclosure acquires and identifies the image according to the long stem of the cherry to determine the picking point, thereby being more convenient and efficient. Meanwhile, by determining the size of the cherry according to the number of pixels in the image for the cherry, the present disclosure can classify the cherry automatically, and save a manual sorting cost.

According to the present disclosure, the original grayscale image and the mask image are the same in size. The mask image includes a cherry fruit region and a remaining region. Since the cherry greatly differs from surrounding green leaves in color, the H-based segmentation performed through an HIS model can obtain a more desirable and accurate cherry fruit region. The fruit region is excluded from the original grayscale image through the mask image to obtain the grayscale image only including the stem and the neighboring region thereof, which prevents the color of the fruit from affecting a binarization result in subsequent binarization. From a binary image for the stem and the neighboring region thereof, the connecting point and the growing point can be searched. A connecting line between the two points is approximate to a length of the stem. Hence, the weighted calculation can be performed according to an actual need to obtain the picking point on the stem.

According to the present disclosure, the color factor includes components in the three primary colors and different combination thereof such as the R component, the G component, the B component, a |G−B| component, a |G−R| component and a |G−B|+|G−R| component. When some color factor for calculating the component value of the color in the cherry region and the component value of the color in the background region makes the intersection between the component values in the scatter plot least, there is a maximum grayscale difference between the cherry region and the background region in the grayscale image obtained by performing the grayscale extraction with the color factor, for better ease of subsequent image processing.

According to the present disclosure, the stem-branch contour after the binarization is white or black, while the remaining background is black or white reversely. With the white stem-branch contour for description, the stem includes one end connected to the branch at the growing point, and the other end connected to the fruit at the connecting point. Since the stem has a certain width, there comes a curve at a junction between the stem contour and the boundary of the fruit region. The point $A_1$ and the point $B_1$ are selected as two endpoints of the curve, and the midpoint on the connecting line between the two points serves as the connecting point. For a circle with any point on the contour where the stem region is located as a center and the segment $|A_1B_1|$ as a radius, a proportion of a white region to the whole circle is $\alpha$. When the center is located on the contour of the stem region, the ratio $\alpha$ is less than a preset threshold. When the ratio $\alpha$ is greater than the preset threshold, the white portion of the circle includes not only the stem region, but also the branch region or other stem regions. According to this principle, the growing point can be determined.

The present disclosure acquires the image for the picked cherry, while ensuring that each image has a same pixel, a same size, and a same actual area. As a consequence, while variables are consistent, the area of the cherry is replaced with the number of pixels in the contour of the cherry in the image to take as a measured size of the cherry. Meanwhile, the present disclosure processes the classification grayscale image with the edge detection operator to obtain a more accurate contour of the cherry.

Figure 2:
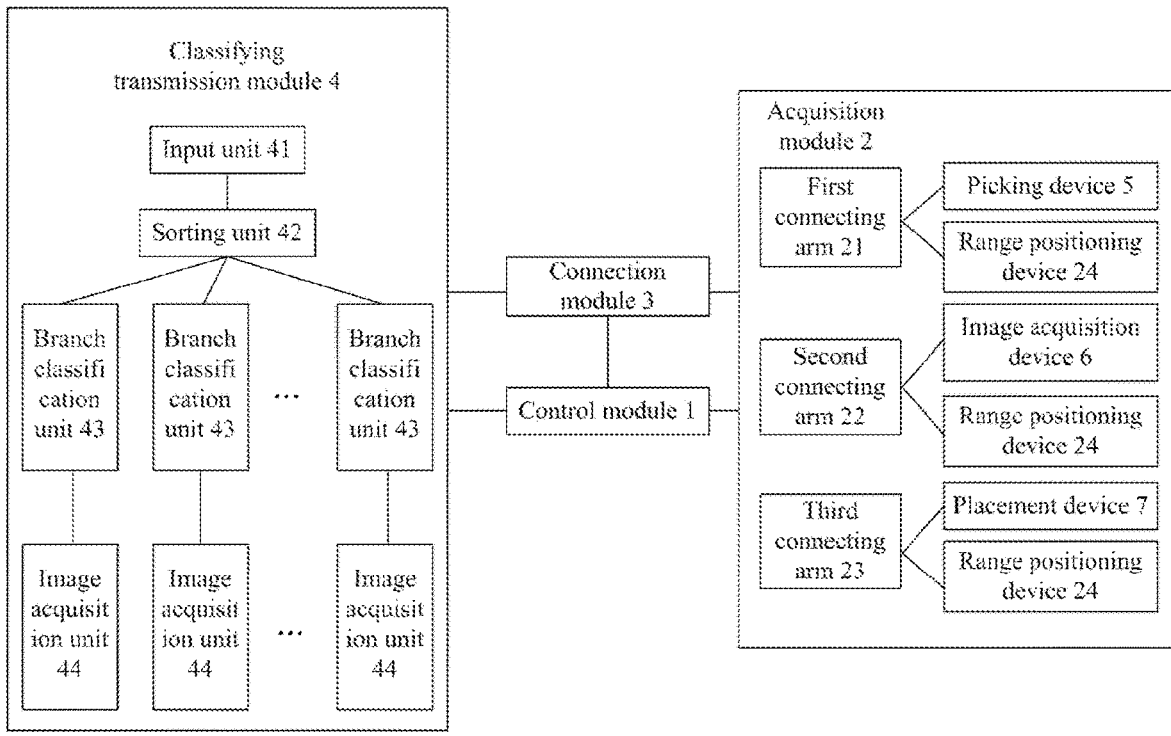
FIG. 2 is a schematic view of a cherry picking and classifying device according to the present disclosure.

As shown in FIG. 2, a cherry picking and classifying device based on machine vision includes: an acquisition module 2, a classifying transmission module 4, a connection module 3, and a control module 1.

The acquisition module 2 is configured to acquire an image of a cherry with a stem hung on a branch, and pick the cherry. The acquisition module includes at least three connecting arms. A range positioning device 24 is provided on each of the three connecting arms. A tail end of a first connecting arm 21 is provided with a picking device 5. A tail end of a second connecting arm 22 is provided with an image acquisition device 6. A tail end of the third connecting arm 23 is provided with a placement device 7. The classifying transmission module 4 is configured to acquire an image for a picked cherry, and calculate a size of the cherry for classification. The classifying transmission module includes an input unit 41. The input unit transmits the picked cherry to each of a plurality of branch classification units 43 through a sorting unit 42. An image acquisition unit 44 is provided fittingly above the branch classification unit. The connection module 3 is configured to connect the acquisition module and the classifying transmission module, and drive the acquisition module to move. The control module 1 is configured to control work of the cherry picking and classifying device.

According to the present disclosure, the acquisition module acquires and photographs an image for a cherry on a branch, processes and analyzes the image for the cherry, determines a picking point on a stem corresponding to the cherry, and picks the cherry. The connection module drives the acquisition module to move, and puts a cherry picked by the acquisition module into the classifying transmission module. The classifying transmission module arranges cherries sequentially for transmission, acquires images of the cherries to obtain sizes of the cherries, and transmits the cherries to different positions according to the sizes of the cherries for storage.

According to the present disclosure, the connecting arms can be telescopic and bendable, such that the picking device or the image acquisition device can pick the cherry or photograph the image from different positions and angles. Devices having different functions are provided at tail ends of the connecting arms, so it is freer to acquire the image and pick the cherry. When affected by leaves, the connecting arms can be adjusted in angle and position for working. Since the range positioning device is provided on each of the connecting arms, the cherry can be positioned through distances from three different points to the cherry, for ease of subsequent picking. The placement device may be an elastic net bag or other devices, and is configured to temporarily place the picked cherry and prevent a dropping cherry from being damaged.

According to the present disclosure, cherries in the placement device are continuously transmitted by the input unit after transferred to the input unit. The cherries can be flowed to different branch classification units through the sorting unit, the branch classification units each transmit one cherry at a time, and two adjacent cherries are spaced by a certain distance. The image acquisition unit is provided fittingly above the branch classification unit, and a width of a visual field of the image acquisition unit is the same as a width of the branch classification unit, which ensures that each acquired image has same size and pixel.

In an embodiment of the present disclosure, contents of the present disclosure are illustrated and described by taking a whole picking and classifying process of the cherry as a sequence. Before picking, the control module controls the acquisition module to reach a position near a cherry to be picked. The cherry to be picked is initially positioned through the range positioning devices of the three connecting arms on the acquisition module. Relative positions of the cherry, the picking device, the image acquisition device and the placement device are determined. The placement device is located under the cherry to directly receive the dropping cherry. An angle and a position of the image acquisition device can be adjusted freely and finely through the second connecting arm to photograph and acquire an image of a cherry hung on a branch. The image includes a cherry fruit, a stem, and a part of the branch connected to the stem.

Figure 3:
FIG. 3 illustrates an original grayscale image of a cherry according to an embodiment of the present disclosure.

The acquired image is filtered to remove apart of noise and then taken as an original image for next processing. A grayscale of the original image is extracted through a color factor to obtain an original grayscale image. The photographed original image is a colored RGB model image. When the original image is transformed into the grayscale image, there are different grayscale images according to different transformation manners. The grayscale difference between the cherry region and the background region also depends on the different transformation manners. The common grayscale transformation may be implemented by performing grayscale extraction according to one component in the three primary colors, or through a weighted average of the three primary colors. In the embodiment, a part of the transformation manners are listed, including an R component, a G component, a B component, a |G−B| component, a |G−R| component, a |G−B|+|G−R| component, and a $\mu_1|\alpha_1 G-\beta_1 B|+\mu_2|\alpha_2 G-\gamma_1 R|+\mu_3|\gamma_2 B-\beta_2 R|$ composite component, where $\alpha$, $\beta$, $\gamma$ and $\mu$ are all parameters. A plurality of historically acquired cherry images are selected. A component value of a color factor in a cherry region and a component value of a same color factor in a background region are sampled, and drawn into a scatter plot. A color factor making an intersection between the component values of the cherry region and the background region in the scatter plot least is selected as the color factor for grayscale extraction in the embodiment, thereby obtaining the original grayscale image as shown in FIG. 3.

The original image is transformed from an RGB model to an HIS model, so as to indicate color components with an H, an S, and an I more suitable for visual sense organs of people. The model transformation equation is expressed by:

$$I = \frac{R+G+B}{3}$$

$$H = \begin{cases} W, & B \le G \\ 2\pi - W, & B > G \end{cases}, W = \cos^{-1}\left\{\frac{2R-G-B}{2\left[(R-B)^2+(R-G)(G-B)\right]^{1/2}}\right\}$$

$$S = 1 - \frac{3\min(R, G, B)}{R+G+B}$$

Figure 4:
FIG. 4 illustrates a mask image of a cherry according to an embodiment of the present disclosure.

After transformed into the HIS image, the original image is subjected to H-based segmentation to obtain a mask image, as shown in FIG. 4. In the image, the black portion refers to a fruit region, while the white portion refers to a background region. For an image processed by the mask image, the fruit region may be deleted and only the background region is retained.

Figure 5:
FIG. 5 illustrates a grayscale image of a stem and a neighboring region according to an embodiment of the present disclosure.

Therefore, the original grayscale image is processed by the mask image to obtain a grayscale image for the stem and a neighboring region thereof, as shown in FIG. 5. In the image, the grayscale image for the stem and the branch is retained, while the fruit region is excluded, which prevents a color of the fruit region from affecting a result in subsequent binarization. In the embodiment, the grayscale image for the stem and the branch is binarized with an Otsu algorithm to obtain a binary image as shown in FIG. 6. In the image, the white portion refers to the stem region and the branch region, while the black portion refers to a region other than the stem region and the branch region. A stem-branch contour is obtained from a resulting binary image through a contour tracing algorithm. The contour is the intersection between the white and the black in the binary image. By coinciding the binary image with the mask image, junctions between the stem contour and the boundary of the fruit region can be obtained, as shown by a curve between a point $A_1$ and a point $B_1$ in FIG. 6. Since the stem has a certain width, both the point $A_1$ and the point $B_1$ are the junctions between the stem and the fruit. In the embodiment, a midpoint $C_1$ on a connecting line between the two points is selected as a connecting point between the stem and the fruit.

While the point $A_1$ moves gradually along a left contour of the stem contour and away from the fruit region, a circle with any point $A_i$ on the stem contour as a center and a length of a segment $|A_1B_1|$ as a radius is drawn, where i is a natural number greater than or equal to 1. In response to a movement in the stem contour, the circle $A_i$ includes a white portion of a region where the stem is located and a black background portion. As can be seen from a shape of the stem, a proportion of the white portion in the circle $A_i$ is less than a preset threshold. While the stem is basically straight, $\alpha=S_{CAi}/S_{Ai}$ is about one-half, namely one half is the white stem region, and the other half is the black background region. While the stem is bent partially, since the width of the stem is far less than the length of the stem in the shape of the stem, $\alpha=S_{CAi}/S_{Ai}$ is slightly greater than the one-half. In the embodiment, there is a 10% of fluctuation, namely the preset threshold is 0.55. When $\alpha$ is greater than 0.55, the white region in the circle $A_i$ includes not only the stem, but also the branch or other stems. In this case, among all points with a greater than 0.55 on the contour, the point $A_i$ with a minimum i value is considered as one junction between the stem and the branch. The point $B_i$ is determined same as the point $A_i$, and is one connecting point between the stem and the branch. The connecting line between the point $A_i$ and the point Bi may be viewed as a connected portion between the stem and the branch. A midpoint $C_i$ on the connecting line between the point $A_i$ and the point $B_i$ serves as the growing point of the stem on the branch.

While the connecting point $C_1(x_1,y_1)$ and the growing point $C_i(x_i,y_i)$ are obtained, weighted averaging is performed on the connecting point and the growing point to obtain a picking point $C_c(ax_1+bx_i,ay_1+by_i)$, where a+b=1, and a and b are positive parameters. In actual picking, the long stem or the short stem can be retained as required. In a case where both a and b are 0.5, the midpoint on the connecting line between the connecting point and the growing point is selected as the picking point for picking. The first connecting arm in the acquisition module moves, such that the acquisition device reaches the picking point to shear the stem, and the cherry falls into the placement device. When the stem of the cherry has a certain bend, the midpoint on the connecting line between the connecting point and the growing point is located out of the stem region. In this case, a parallel line of the segment |A₁B₁| is made through the midpoint. There are two intersections between the parallel line and the stem contour, and any intersection or the midpoint between the two intersections can be selected as a new picking point for picking.

When a number of cherries in the placement device reaches a number threshold or a mass of cherries in the placement device exceeds a mass threshold, the connection module controls the acquisition module for recycling. As a result, the placement device is driven to locate above the input unit of the classifying transmission module, and the cherry in the placement device is transmitted to the input unit. The whole classifying transmission module employs a conveyor belt for transmission. When the cherry on the input unit is transmitted to an entrance of the sorting unit, the sorting unit flows piled cherries to different branch classification units. The cherries on the branch classification units are transmitted one by one, and adjacent two cherries are spaced at a certain distance, which ensures that the image acquisition unit acquires an image of one cherry each time.

After a classification image of the cherry is acquired, the classification image is filtered and transformed into a classification grayscale image. An edge detection operator of the classification grayscale image is calculated. The edge detection operator includes a Robert operator, a Prewitt operator, a Sobel operator, a Canny operator, and the like. Alternatively, any one of the operators can be selected for edge detection, thereby extracting a contour feature of the cherry. The contour of the cherry can reflect a size of the cherry. The classification image acquired by the image acquisition unit has a same pixel. While an actual photographed area is the same, an area of the contour of the cherry in the image can serve as an actual size of the cherry for classification. The area of the contour of the cherry can be represented by a number of pixels in the contour of the cherry. Therefore, an interval for a number of pixels and a corresponding cherry grade can be set in advance according to an actual need. After the classification image is acquired for the picked cherry, a number of pixels in the contour of the cherry is calculated. According to the interval to which the number of pixels belongs, the cherry is classified to a corresponding grade, and transmitted through the branch classification unit to a storage position corresponding to the grade.

The above embodiment is further illustration and description on the present disclosure for ease of understanding, rather than any limit to the present disclosure. Any modification, equivalent substitution, improvement and the like made within the spirit and principle of the present disclosure shall fall within the protection scope of the present disclosure.

What is claimed is:

1. A cherry picking and classifying method based on machine vision, comprising:
   acquiring an image for a cherry with a stem hung on a branch, filtering the image to remove noise, and taking a resulting image as an original image;
   processing the original image to extract a stem feature of the cherry, and determining a picking point for picking, comprising:
      performing grayscale extraction on the original image with a color factor to obtain an original grayscale image;
      transforming the original image into a hue-intensity-saturation (HIS) model image, and performing H-based segmentation to obtain a mask image;
      excluding a fruit region in combination with the original grayscale image and the mask image to obtain a grayscale image for the stem and a neighboring region thereof;
      binarizing the grayscale image with an Otsu algorithm to obtain a connecting point between the stem and the fruit, and a growing point between the stem and the branch; and
      performing weighted calculation on the connecting point and the growing point to obtain the picking point;
   acquiring an image for a picked cherry to obtain a classification image;
   processing the classification image to extract a contour feature of the cherry, and calculating a size of the cherry according to the contour feature; and
   classifying the cherry according to size data of the cherry.

2. The cherry picking and classifying method based on machine vision according to claim 1, wherein the color factor is one of red (R), green (G), and blue (B) components in three primary colors or one of composite components of the three primary colors; a plurality of historically acquired cherry images are sampled; a component value of a color in a cherry region and a component value of a color in a background region are calculated with a same color factor to form a scatter plot; and a color factor making an intersection between the component values of the colors of the two regions in the scatter plot least is selected to perform the grayscale extraction on the original image.

3. The cherry picking and classifying method based on machine vision according to claim 1, wherein a stem-branch contour is obtained from a binary image with a contour tracing algorithm; after the binary image coincides with the mask image, the stem-branch contour is intersected with a boundary of the fruit region on the mask image at a point $A_1$ and a point $B_1$; and a midpoint on a connecting line between the point $A_1$ and the point $B_1$ serves as the connecting point; and
   in gradual movement from the point $A_1$ along the stem-branch contour and away from the fruit region, there comes a point $A_i$ that makes $\alpha = S_{CAi}/S_{Ai}$ greater than a preset threshold; in gradual movement from the point $B_1$ along the stem-branch contour and away from the fruit region, there comes a point $B_j$ that makes $\alpha = S_{CBj}/S_{Bj}$ greater than the preset threshold; and a midpoint on a connecting line between the point $A_i$ and the point $B_j$ serves as the growing point, wherein
   $S_{Ai}$ and $S_{Bj}$ are respectively a number of pixels in a circle $A_i$ and a circle $B_j$; the circle $A_i$ and the circle $B_j$ respectively take the point $A_i$ and the point $B_j$ as a center and a length of a segment $|A_1B_1|$ as a radius; and $S_{CAi}$ and $S_{CBj}$ are respectively a number of pixels within an enclosing range of the two circles and the stem-branch contour.

4. The cherry picking and classifying method based on machine vision according to claim 1, wherein the second processing comprises:
   filtering the classification image to remove noise, and transforming a resulting image into a classification grayscale image;
   processing the classification grayscale image with an edge detection operator to extract a contour of the cherry; and
   calculating a number of pixels in the contour of the cherry.

5. A cherry picking and classifying device based on machine vision, applied to the cherry picking and classifying method according to claim 1, and comprising:

an acquisition module configured to acquire an image for a cherry with a stem hung on a branch, and pick the cherry;

a classifying transmission module configured to acquire an image for a picked cherry and calculate a size of the cherry for classifying;

a connection module configured to connect the acquisition module and the classifying transmission module, and drive the acquisition module to move; and a control module configured to control work of the cherry picking and classifying device.

6. The cherry picking and classifying device based on machine vision according to claim 5, wherein the acquisition module comprises at least three connecting arms; a range positioning device is provided on each of the three connecting arms; a tail end of a first connecting arm is provided with a picking device; a tail end of a second connecting arm is provided with an image acquisition device; and a tail end of a third connecting arm is provided with a placement device.

7. The cherry picking and classifying device based on machine vision according to claim 5, wherein the classifying transmission module comprises an input unit; the input unit transmits the picked cherry to each of a plurality of branch classification units through a sorting unit; and an image acquisition unit is provided fittingly above each of the branch classification units.

8. The cherry picking and classifying device based on machine vision according to claim 5, wherein the color factor is one of red (R), green (G), and blue (B) components in three primary colors or one of composite components of the three primary colors; a plurality of historically acquired cherry images are sampled; a component value of a color in a cherry region and a component value of a color in a background region are calculated with a same color factor to form a scatter plot; and a color factor making an intersection between the component values of the colors of the two regions in the scatter plot least is selected to perform the grayscale extraction on the original image.

9. The cherry picking and classifying device based on machine vision according to claim 8, wherein the classifying transmission module comprises an input unit; the input unit transmits the picked cherry to each of a plurality of branch classification units through a sorting unit; and an image acquisition unit is provided fittingly above the branch classification unit.

10. The cherry picking and classifying device based on machine vision according to claim 6, wherein a stem-branch contour is obtained from a binary image with a contour tracing algorithm; after the binary image coincides with the mask image, the stem-branch contour is intersected with a boundary of the fruit region on the mask image at a point $A_1$ and a point $B_1$; and a midpoint on a connecting line between the point $A_1$ and the point $B_1$ serves as the connecting point; and in gradual movement from the point $A_1$ along the stem-branch contour and away from the fruit region, there comes a point Ai that makes $\alpha=S_{CAi}/S_{Ai}$ greater than a preset threshold; in gradual movement from the point $B_1$ along the stem-branch contour and away from the fruit region, there comes a point $B_j$ that makes $\alpha=S_{CBj}/S_{Bj}$ greater than the preset threshold; and a midpoint on a connecting line between the point $A_i$ and the point $B_j$ serves as the growing point, wherein $S_{Ai}$ and $S_{Bj}$ are respectively a number of pixels in a circle $A_i$ and a circle $B_j$; the circle $A_i$ and the circle $B_j$ respectively take the point $A_i$ and the point $B_j$ as a center and a length of a segment $|A_1B_1|$ as a radius; and $S_{CAi}$ and $S_{CBj}$ are respectively a number of pixels within an enclosing range of the two circles and the stem-branch contour.

11. The cherry picking and classifying device based on machine vision according to claim 10, wherein the classifying transmission module comprises an input unit; the input unit transmits the picked cherry to each of a plurality of branch classification units through a sorting unit; and an image acquisition unit is provided fittingly above the branch classification unit.

12. The cherry picking and classifying device based on machine vision according to claim 5, wherein the second processing comprises:

filtering the classification image to remove noise, and transforming a resulting image into a classification grayscale image;

processing the classification grayscale image with an edge detection operator to extract a contour of the cherry; and calculating a number of pixels in the contour of the cherry.

13. The cherry picking and classifying device based on machine vision according to claim 12, wherein the classifying transmission module comprises an input unit; the input unit transmits the picked cherry to each of a plurality of branch classification units through a sorting unit; and an image acquisition unit is provided fittingly above the branch classification unit.

* * * * *